United States Patent [19]
Moussa et al.

[11] Patent Number: 6,035,406
[45] Date of Patent: Mar. 7, 2000

[54] PLURALITY-FACTOR SECURITY SYSTEM

[75] Inventors: Mohamed A. Moussa, Sunnyvale; Chih S. Chan, Saratoga, both of Calif.

[73] Assignee: Quintet, Inc., Cupertino, Calif.

[21] Appl. No.: 08/831,854

[22] Filed: Apr. 2, 1997

[51] Int. Cl.[7] .................................................. G06F 11/00
[52] U.S. Cl. .......................... 713/202; 713/201; 380/4; 380/23; 380/25; 380/30; 382/115; 382/116
[58] Field of Search ................................... 713/202, 201; 382/115, 116, 117; 380/23, 25, 30, 4

[56] References Cited

U.S. PATENT DOCUMENTS

| | | | |
|---|---|---|---|
| 4,405,829 | 9/1983 | Rivest et al. | 380/30 |
| 4,438,824 | 3/1984 | Mueller-Schloer | 380/23 |
| 4,736,423 | 4/1988 | Matyas | 380/23 |
| 4,799,153 | 1/1989 | Hahn et al. | 713/201 |
| 5,036,461 | 7/1991 | Elliott et al. | 380/24 |
| 5,191,611 | 3/1993 | Lang | 380/25 |
| 5,191,613 | 3/1993 | Graziano et al. | 380/25 |
| 5,204,961 | 4/1993 | Barlow | 713/201 |
| 5,241,594 | 8/1993 | Kung | 380/3 |
| 5,278,904 | 1/1994 | Servi | 380/23 |
| 5,432,864 | 7/1995 | Lu et al. | 382/118 |
| 5,455,953 | 10/1995 | Russell | 710/266 |
| 5,469,576 | 11/1995 | Dauerer et al. | 713/200 |
| 5,481,720 | 1/1996 | Loucks et al. | 713/201 |
| 5,491,752 | 2/1996 | Kaufman et al. | 380/30 |
| 5,495,533 | 2/1996 | Linehan et al. | 380/21 |
| 5,497,421 | 3/1996 | Kaufman et al. | 380/23 |
| 5,506,961 | 4/1996 | Carlson et al. | 713/200 |
| 5,534,855 | 7/1996 | Shockley et al. | 340/825.3 |
| 5,535,276 | 7/1996 | Ganesan | 380/25 |
| 5,581,630 | 12/1996 | Bonneau, Jr. | 382/116 |
| 5,694,471 | 12/1997 | Chen et al. | 380/25 |
| 5,706,427 | 1/1998 | Tabuki | 713/202 |
| 5,719,950 | 2/1998 | Osten et al. | 382/115 |
| 5,742,683 | 4/1998 | Lee et al. | 380/23 |
| 5,774,551 | 6/1998 | Wu et al. | 380/25 |
| 5,799,092 | 8/1998 | Kristol et al. | 380/51 |
| 5,841,970 | 11/1998 | Tabuki | 713/202 |
| 5,881,226 | 10/1996 | Veneklase | 713/202 |
| 5,907,149 | 5/1999 | Marckini | 235/487 |

OTHER PUBLICATIONS

IEEE Spectrum, "Vital Signs of Identity", by Miller PP 22–30, Feb. 1994.

*Primary Examiner*—Robert W. Beausoliel, Jr.
*Assistant Examiner*—Wasseem H. Hamdan
*Attorney, Agent, or Firm*—Swernofsky Law Group

[57] ABSTRACT

The invention provides a method and system for simultaneously authenticating a user using two or more factors, such as both a password and a physical token or both a password and biometric information. The user presents a physical token including a storage device to a processor and attempts to log in using a first password; the processor includes a login service which receives the first password, accesses the storage device to transform the first password into a second password, and authenticates the second password using an operating system for the processor. The storage device includes encrypted information regarding the second password which can be relatively easily determined in response to the first password, but which cannot be relatively easily determined without the first password. The system or the storage device may also store information for biometric authentication of the user.

9 Claims, 1 Drawing Sheet

PLURALITY-FACTOR SECURITY SYSTEM

BACKGROUND OF THE INVENTION

1. Field of the Invention

The invention relates to computer security systems.

2. Related Art

Security systems which attempt to authenticate a user are based on one or more of three kinds of information: (1) secret information which is shared by the user and the system, such as a password, PIN, or pass phrase; (2) a physical object which is possessed by the user and recognized by the system, such as a physical key, token or active electronic device; and (3) biometric information which is unique to the user and which can be received and authenticated by the system, such as a fingerprint, handwritten signature, retinal scan, or voiceprint. Security systems which use more than one of these factors are considered more secure than those which do not.

Electronic security systems which require a physical token may operate by using a challenge and response system, in which the system issues an electronic challenge to the physical token and in which the user interacts with the physical token to obtain an electronic response. If the response is one which the system associates with the challenge as proper, the physical token is recognized and the security system is able to authenticate the user, at least using the physical factor.

A first problem which has arisen in the art is that such physical tokens are thus required to be "active," that is that they require electrical power to operate and therefore have a limited operational lifetime.

A second problem which has arisen in the art is that known security systems which require such physical tokens operate by first authenticating the user using secret information (such as requiring the user to log in using a password), then execute an application program for security authentication of the physical token. Similarly, known security systems which require biometric information operate by first authenticating the user using secret information, then execute an application program for security authentication of the biometric information. Security systems which allow users to execute application programs before they have been fully authenticated are considered less secure than those which do not.

A third problem which has arisen in the art is that known security systems which require such physical tokens require the user to enter the secret information (such as a password or PIN) to the physical token for the challenge and response. This provides an additional source for authentication error or for exposure of the user's secret information, neither of which would be desirable.

Accordingly, it would be desirable to provide a method and system for providing authentication using two or more factors without allowing the user to execute any application programs before authentication for all factors is complete. It would also be desirable to provide a method and system for providing electronic authentication using a physical token which does not require electrical power to operate. It would also be desirable to provide a method and system for providing electronic authentication using a physical token which does not require the user to enter data or otherwise interact with the physical token. These advantages are achieved in an embodiment of the invention in which the physical token includes a passive storage device and a login service obtains password information from the storage device, so as to simultaneously authenticate the user with both a password and the physical token itself.

SUMMARY OF INVENTION

The invention provides a method and system for simultaneously authenticating a user using two or more factors, such as using both a password and a physical token, or using a password, a physical token, and biometric information. The user presents a physical token including a storage device to a processor and attempts to log in using a first password; the processor includes a login service which receives the first password, accesses the storage device to transform the first password into a second password, and authenticates the second password using an operating system for the processor. In a preferred embodiment, the storage device includes encrypted information regarding the second password which can be relatively easily determined in response to the first password, but which cannot be relatively easily determined without the first password.

In alternative embodiments, the system or the storage device may store information for biometric authentication of the user.

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using general purpose processors or special purpose processors adapted to particular process steps and data structures described herein, and that implementation of the process steps and data structures described herein would not require undue experimentation or further invention.

Inventions described herein may be used in conjunction with inventions described in one or more of the following applications:

application Ser. No. 08/169,654, filed Dec. 17, 1993, in the name of the same inventors, titled "Method of Automated Signature Verification", attorney docket number ACS-001, now abandoned.

application Ser. No. 08/483,942, filed Jun. 7, 1995, in the name of the same inventors, titled "Method of Automated Signature Verification", attorney docket number ACS-002.

application Ser. No. 08/519,430, filed Aug. 25, 1995, in the name of the same inventors, titled "Method of Secure Communication Using Signature Verification", attorney docket number QUIN-003.

application Ser. No. 08/641,104, filed Apr. 29, 1996, in the name of the same inventors, titled "Secure Application of Seals", attorney docket number QUIN-006.

application Ser. No. 08/639,613, filed Apr. 29, 1996, in the name of the same inventors, titled "Automated Verification and Prevention of Spoofing for Biometric Data", attorney docket number QUN-008.

Each of these applications is hereby incorporated by reference as if fully set forth herein. These applications are collectively referred to herein as the "Incorporated Disclosures".

System Elements

Figure 1:
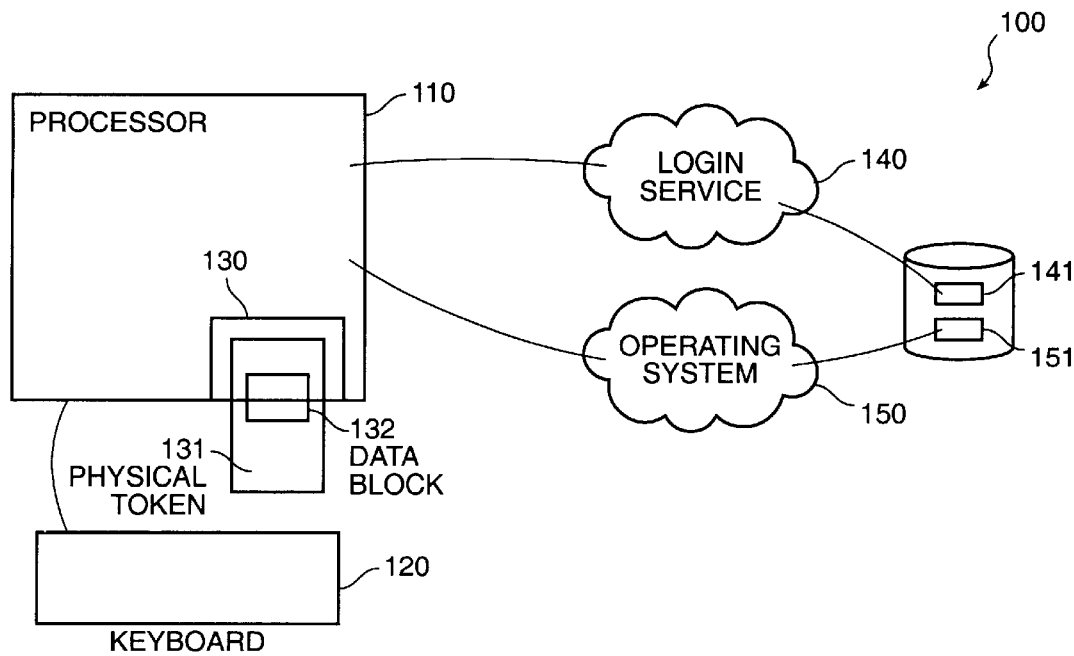
FIG. 1 shows a block diagram of a system for two-factor security authentication.

FIG. 1 shows a block diagram of a system for two-factor security authentication.

A system 100 for two-factor security authentication includes a processor 110, having program and data memory and mass storage; an input device 120, such as a keyboard and mouse or other pointing device; and a storage device drive 130 capable of receiving a physical token 131.

In a preferred embodiment, the storage device drive 130 includes a floppy disk drive; a PCMCIA, PC Card, or "smart card" receptacle; a flash memory receptacle; or a credit card receptacle or credit card wipe device for reading and writing magnetic stripes. The physical token 131 comprises a corresponding storage device, such as a floppy disk, a PCMCIA or PC Card, a smart card, a flash memory, or a magnetic-striped card.

The system 110 includes a login service 140 and an operating system 150, both stored on the mass storage and executed by the processor 110 from the program and data memory. Operating systems are known in the art of computers. The login service 140 intercepts attempts by the user to log in to the processor 110, and interacts with the physical token 131 and with the operating system 150 as described herein to perform two-factor security authentication.

The login service 140 maintains an authentication database 141, in which it associates an authentication fingerprint F and an authentication number N, for each particular user for each particular login session. Similarly, the operating system 150 maintains a password database 151, in which it associates a password P with each particular user. In a preferred embodiment, the password P is stored in the password database 151 in an encrypted form. Associating passwords with users is known in the art of computer security.

The physical token 131 includes a data block 132, in which it stores the authentication number N, the password P (in the same encrypted form), and a set of random values which are associated with the fingerprint F.

As used herein, the term "random", as used in phrases such as "random number" or "random value", refers in a preferred embodiment, to numbers or values which are generated by a pseudorandom number generator or a method for generating pseudorandom numbers. However, in alternative embodiments, the term random may refer to numbers or values which are truly random, such as generated by a probabilistic or stochastic process. Techniques relating to randomness and pseudorandomness are described in greater detail in works known in the art, such as D. Knuth, "The Art of Computer Programming", vol. 2.

In a preferred embodiment, the fingerprint F is derived in response to the set of random values by computation of a CRC or hashing function.

Method of Operation

Figure 2:
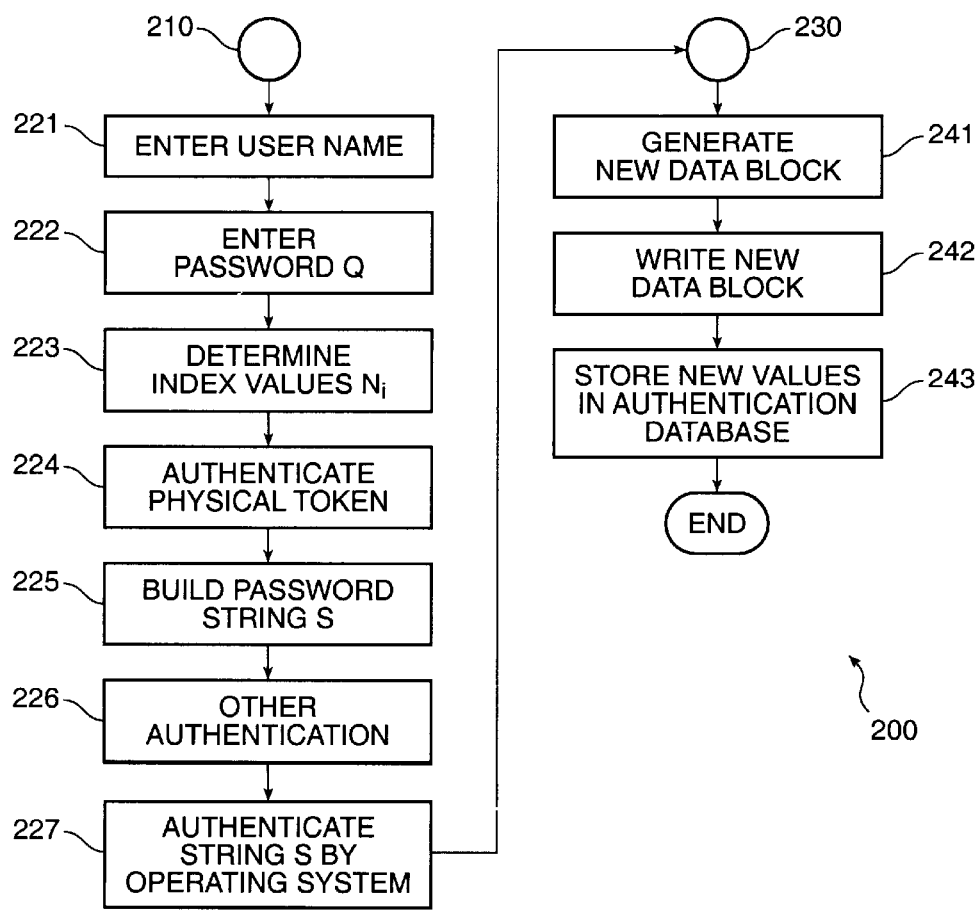
FIG. 2 shows a process flow diagram of a method for two-factor security authentication.

FIG. 2 shows a process flow diagram of a method for two-factor security authentication.

A method 200 for two-factor security authentication includes a sequence of flow points and steps as described herein.

At a flow point 210, the user attempts to obtain access to the processor 110, and the method 200 for two-factor security authentication is started.

At a step 221, the user enters their associated user name. In a preferred embodiment, the user name is a unique value which describes the user, and may comprise the user's actual name, but may also comprise a mnemonic name such as the user's initials. User names are known in the art of computer security. The login service 140 receives the user name and begins execution on the processor 110.

At a step 222, the user enters a first password Q. The login service 140 receives the first password Q. The first password Q is not the password P which the operating system 150 associates with the user name, and cannot be used to obtain access to the processor 110 using the operating system 150. The login service 140 uses the physical token 131 to determine the password P in response to the first password Q, and thereafter authenticates the password P using the operating system 150, thus authenticating both that the physical token 131 is present and that the first password Q was correctly entered. In a preferred embodiment, references to the password P indicate the encrypted form thereof.

At a step 223, the login service 140 determines a set of index values Ni in response to the first password Q. In a preferred embodiment, one index value Ni is determined for each character of the password P, plus one additional index value N0, and the password P is selected to have the maximum length permitted by the operating system 150. Thus, if the operating system 150 allows (p)-character passwords, the password P will have (p) characters and there will be at least (p+1) index values Ni.

In a preferred embodiment, the step 223 is performed using the following technique:

At a sub-step 223(a), each possible combination of letters of the first password Q is determined. Thus, if the first password Q is "ABCD", there will be 15 nsuch possible combinations, "A", "B", "C", "D", "AB", "AC", "AD", "BC", "BD", "CD", "ABC", "ABD", "ACD", "BCD", and "ABCD". If there are more than (p+1) such combinations, the first (p+1) combinations are selected.

At a sub-step 223(b), each selected combination from the sub-step 223(a) is converted to an integer value. In a preferred embodiment, this is performed by casting the selected string values to integer values.

At a sub-step 223(c), each integer value from the sub-step 223(b) is input to a pseudorandom number generator, so as to determine a pseudorandom number in response thereto.

At a step 224, the login service 140 authenticates the physical token 131 and determines the authentication number N stored thereon.

In a preferred embodiment, the step 224 is performed using the following technique:

At a sub-step 224(a), the data block 132 from the physical token 131 is read into data memory for the processor 110. In a preferred embodiment, the data block 132 comprises 2048 values. There is no special significance to the value 2048; other values could be used in alternative embodiments.

At a substep 224(b), the login service 140 generates a data block fingerprint D in response to the data block 132. In a preferred embodiment, the data block fingerprint D is computed using a CRC or hashing function using all 2048 values in the data block 132.

At a sub-step 224(c), the login service 140 compares the data block fingerprint D with the fingerprint F it has stored in the authentication database 141. If the comparison is identical, authentication is so far successful, and the method 200 proceeds to the next sub-step 224(d). If the comparison is not identical, authentication is unsuccessful, and the method 200 proceeds with an operation for unsuccessful authentication, as described herein with reference to the step 227.

At a sub-step 224(d), the additional index value N0 is used to index into a selected section of the data block 132. In a preferred embodiment, the value at location (2000+N0) is used as the authentication number N. There is no special significance to the value 2000; other values could be used in alternative embodiments.

At a sub-step 224(e), the login service 140 compares the value at location (2000+N0) with the authentication number N it has stored in the authentication database 141. If the comparison is identical, authentication is so far successful, and the method 200 proceeds to the next step 225. If the comparison is not identical, authentication is unsuccessful, and the method 200 proceeds with an operation for unsuccessful authentication, as described herein with reference to the step 227.

At a step 225, the authentication number N is used as an offset for the index values Ni, and each individual indexing sum (Ni+N) is used to index into the data block 132 for a corresponding character Si of a string S.

In a preferred embodiment, the step 225 is performed using the following technique:

Each indexing sum (Ni+N) is computed.

Each indexing sum (Ni+N) is selected to be unique with regard to all other indexing sums. If any indexing sums are identical, the second and succeeding indexing sums are incremented linearly, modulo 2000, until a unique value is obtained for each indexing sum and thus a unique index is obtained for each corresponding character Si of the string S.

The corresponding characters Si are assembled into the string S.

At a step 226, the login service 140 performs such other authentication as desired. In a preferred embodiment, there is no such other authentication; however, in alternative embodiments, the login server 140 may perform signature verification for the user in the step 226.

The step 226 may be performed using the following technique:

The login server 140 maintains a signature verification template T, using techniques such as described in detail in the Incorporated Disclosures.

At a sub-step 226(a), the login server 140 receives a signature from the user (using a signature receiving device, such as a writing tablet).

At a sub-step 226(b), the login server 140 determines a received signature template R, using techniques such as described in detail in the Incorporated Disclosures.

At a sub-step 226(c), the login server 140 compares the received signature template R with the signature verification template T, using techniques such as described in detail in the Incorporated Disclosures. If the comparison is acceptable, authentication is so far successful, and the method 200 proceeds to the next step 227. If the comparison is not acceptable, authentication is unsuccessful, and the method 200 proceeds with an operation for unsuccessful authentication, as described herein with reference to the step 227.

The step 226 may alternatively be performed using the following technique:

At an alternative sub-step 226(a*), the login server 140 reads a signature verification template T from the physical token 131, the signature verification template T having been generated using techniques such as described in detail in the Incorporated Disclosures. The signature verification template T may be distributed in the data block 132 using a technique similar to the techniques described herein for distribution of the password P in the data block 132.

At an alternative sub-step 226(b*), the login server 140 receives a signature from the user (using a signature receiving device, such as a writing tablet).

At an alternative sub-step 226(c*), the login server 140 determines a received signature template R, using techniques such as described in detail in the Incorporated Disclosures.

At an alternative sub-step 226(d*), the login server 140 compares the received signature template R with the signature verification template T, using techniques such as described in detail in the Incorporated Disclosures. If the comparison is acceptable, authentication is so far successful, and the method 200 proceeds to the next step 227. If the comparison is not acceptable, authentication is unsuccessful, and the method 200 proceeds with an operation for unsuccessful authentication, as described herein with reference to the step 227.

At a step 227, the login service 140 passes the string S to the operating system 150, which compares it with the password P. If the comparison is identical, authentication is successful, and the method 200 proceeds to the flow point 230. If the comparison is not identical, authentication is unsuccessful, and the method 200 proceeds with an operation for unsuccessful authentication.

In a preferred embodiment, the login server 140 displays the fact of unsuccessful authentication and allows the user to try again at the flow point 210 after a time delay. In alternative embodiments, such unsuccessful authentication events might be logged, or an alarm or other signal might be generated in response thereto. Various methods for treatment of unsuccessful authentication are known in the art of computer security.

At a flow point 230, the user has been successfully authenticated. The method 200 for two-factor security authentication continues with a sequence of further flow points and steps.

At a step 241, the login service 140 generates a new data block 132 for the physical token 131.

In a preferred embodiment, the step 241 is performed using the following technique:

The login service 140 generates a new authentication number N*. In a preferred embodiment, the login service 140 selects a random number as the new authentication number N*.

The login service 140 recomputes the indexing sums (Ni+N*) using the new authentication number N*.

The login service 140 generates a set of random values for the data block 132.

At a step 242, the login service 140 writes the new data block 132 onto the physical token 131.

In a preferred embodiment, the step 242 is performed using the following technique:

The login service 140 writes the random values into the data block 132 on the physical token 131.

The login service 140 writes each character Pi of the password P into the data block 132 at the location specified by the corresponding indexing sum (Ni+N*).

The login service 140 writes the new authentication number N* into the data block 132 at the location specified by the additional index value N0, thus, at location (2000+N0).

At a step 243, the login service 140 stores new values in its authentication database 141.

In a preferred embodiment, the step 242 is performed using the following technique:

The login service 140 generates a new fingerprint F* in response to the new data block 132, in like manner as the data block fingerprint D is computed in the sub-step 224(b).

The login service 140 stores the new fingerprint F* and the new authentication number N* in its authentication database 141.

The operating system 150 maintains the password P in its password database 151. The password P is not changed unless the first password Q is changed, in which case the login server 140 generates a new password P and calls on the operating system 150 to store the new password P in its password database 151.

Alternative Embodiments

Although preferred embodiments are disclosed herein, many variations are possible which remain within the concept, scope, and spirit of the invention, and these variations would become clear to those skilled in the art after perusal of this application.

We claim:

1. A method for operating a processor to simultaneously authentic a user using a plurality of factors, said method including the steps of executing an operating system on said processor;

generating an authentication number N;

generating a data block for a physical token;

writing said data block onto said physical token;

generating an authentication fingerprint F responsive to said new data block;

storing said authentication number N and said authentication fingerprint F in an authentication database;

receiving a user name and associated first password Q, said first password Q being other than a password P associated with said user name by said operating system;

receiving said physical token having said data block, said data block including encoded therein said password P and said authentication number N;

determining in response to said data block, said authentication fingerprint F;

authenticating said authentication fingerprint F;

first recovering from said data block, in response to said first password Q, said authentication number N;

second recovering from said data block, in response to said first password Q and said authentication number N, said password P; and authentication said password P with said operating system.

2. A method as in claim 1, wherein said step of first recovering includes the steps of determining an index value N0 in response to said first password Q; and reading said authentication number N from said data block in response to said index value N0.

3. A method as in claim 1, wherein said step of second recovering includes the steps of determining a set of index values Ni in response to said first password Q, one index value Ni for each of a plurality of characters Pi of said password P;

reading each of said plurality of characters Pi from said data block in response to corresponding said index values Ni.

4. A method as in claim 1, including the steps of generating a new authentication number N;

generating a new data block for said physical token, including said new authentication number N;

writing said new data block onto said physical token;

generating a new authentication fingerprint F in response to said new data block; and storing said new authentication number N and said new authentication fingerprint F in said authentication database.

5. A system for simultaneously authenticating a user using a plurality of factors, said system including a processor having an operating system;

means for generating an authentication number N;

means for generating a data block for a physical token, including said authentication number N;

means for writing said data block onto said physical token;

means for generating an authentication fingerprint F in response to said data block;

means for storing said authentication number N and said authentication fingerprint F in an authentication database;

an input device disposed for receiving a user name and an associated first password Q, said first password Q being other than a password P associated with said user name by said operating system;

a drive disposed for receiving said physical token, said physical token having said data block, said data block including encoded therein said password P and said authentication number N;

said data block having values associated with said authentication fingerprint F associated with said user name;

said data block having an authentication number N recoverable in response to said first password Q;

said data block having said password P recoverable in response to said first password Q and said authentication number N, and said operating system disposed for authenticating said password P.

6. A system as in claim 5, wherein said authentication number N is recoverable from said data block in response to an index value N0, said index value N0 determinable in response to said first password Q.

7. A system as in claim 5, wherein each of a plurality of characters Pi of said password P are recoverable from said data block in response to a set of corresponding index values Ni, said set of index values Ni determinable in response to said first password Q.

8. A system as in claim 5, including means for generating a new authentication number N;

means for generating a new data block for said physical token, including said new authentication number N;

means for writing said new data block onto said physical token;

means for generating a new authentication fingerprint F in response to said new data block; and means for storing said new authentication number N and said new authentication fingerprint F in said authentication database.

9. A system for operating a processor to simultaneously authenticate a user using a plurality of factors, said system including a drive capable of receiving a physical token, said physical token having a data block, said data block including a second password encrypted therein, an authentication number and a set of random value associated with an authentication fingerprint;

a login service having said authentication fingerprint and said authentication number associated with said user, said login service configured to receive a first password from said user, reading said data block from said physical token, and determining said second password responsive to said first password, said authentication fingerprint and said authentication number and said data block read from said physical token; and an operating system having said second password associated with said user, said login service additionally configured to provide said second password to said operating system.

* * * * *